United States Patent [19]

Becker

[11] 4,125,522

[45] Nov. 14, 1978

[54] ADHESIVE COMPOSITION

[75] Inventor: Judith W. Becker, Wilmington, Del.

[73] Assignee: E. I. Du Pont de Nemours and Company, Wilmington, Del.

[21] Appl. No.: 872,664

[22] Filed: Jan. 26, 1978

Related U.S. Application Data

[63] Continuation-in-part of Ser. No. 812,366, Jul. 1, 1977, abandoned.

[51] Int. Cl.$^2$ ............................................. C08G 18/48
[52] U.S. Cl. ...................................... 528/61; 36/19.5; 156/331; 528/67; 528/76
[58] Field of Search .............. 260/77.5 AM, 77.5 AP; 156/331; 36/19.5

[56] References Cited

U.S. PATENT DOCUMENTS

| | | | |
|---|---|---|---|
| 2,929,800 | 3/1960 | Hill | 260/77.5 AM |
| 2,968,575 | 1/1961 | Mallonee | 106/287 |
| 3,034,791 | 5/1962 | Gallagher | 260/77.5 AM |
| 3,711,364 | 1/1973 | Akramjian | 260/77.5 AP |
| 3,755,261 | 8/1973 | VanGulick | 260/77.5 AM |
| 3,876,604 | 4/1975 | Caruso et al. | 260/31.8 S |
| 3,891,606 | 6/1975 | Kogon | 260/77.5 AM |
| 3,969,301 | 7/1976 | Thurn | 260/77.5 AM |
| 4,010,146 | 3/1977 | Russell et al. | 260/77.5 AM |
| 4,017,464 | 4/1977 | Kimball | 260/77.5 AM |

*Primary Examiner*—M. J. Welsh

[57] ABSTRACT

A polyurethane adhesive, suitable for bonding of shoe uppers to shoe soles, is based on an isocyanateterminated prepolymer made from tolylene diisocyanate, a poly(tetramethyleneoxy) glycol, and a poly(ethyleneoxy) compound having 7–30 ethyleneoxy groups and 1 or 2 hydroxyl groups. This prepolymer can be cured with a mixture of a methylenedianiline/sodium chloride complex with urea at a temperature of 70° C, which is safe for the usual shoe materials. Adhesive compositions containing both the prepolymer and the curing agent have at room temperature a potlife of at least 24 hours.

11 Claims, No Drawings

ADHESIVE COMPOSITION

CROSS-REFERENCE TO RELATED APPLICATION

This is a continuation-in-part of application Ser. No. 812,366, filed July 1, 1977 and now abandoned.

BACKGROUND OF THE INVENTION

This invention relates to a polyurethane-based adhesive, which is particularly well suited for bonding shoe soles to shoe uppers in footwear manufacturing.

Modern shoe industry employs machines capable of producing large quantities of the necessary shoe parts. Those parts must be joined together to form the final product. In industrial manufacturing processes, joining of shoe parts is often accomplished by adhesive bonding. This step must produce adequate strength bonds in a short time to avoid slowing down the production lines. The most critical bonding operation is the attachment of the shoe uppers to the sole. The sole can be made of a variety of natural or synthetic plastic or elastomeric materials, such as polyvinyl chloride, thermoplastic rubber, styrene/butadiene copolymers, and thermoset polyurethanes.

The adhesives currently most widely used are solvent solutions of synthetic elastomers, such as polychloroprene or polyurethane. The bonding process involves coating the substrates with an adhesive solution, evaporating the solvent, then "reactivating" the adhesive film by the application of mild heat before assembly. Activation temperatures above about 70° C must be avoided because they cause distortion of many heat-sensitive shoe materials.

It would be advantageous to replace the solvent solutions with solvent-free adhesives. Suitable systems are known and are used in other bonding operations. They comprise fluid isocyanate-terminated prepolymers that can be chain-extended or "cured" by admixture with diamine curing agents such as methlenedianiline. The combination of curing agent and an isocyanate-terminated prepolymer should have adequate potlife after mixing but sufficiently high reaction rate for continuous line applications. Unmodified methylenedianiline, when used with typical urethane prepolymers, gives adhesives having too short a potlife to be applicable in sole attaching operations. A complex of methylenedianiline with sodium chloride in a mole ratio of 3:1 is a known curing agent for urethane prepolymers. A typical dispersion of this complex is available from E. I. Du Pont de Nemours & Co, Wilmington, Delaware, under the name "Caytur 21". Mixtures of "Caytur 21" with urethane prepolymers have a very long potlife but are slow to cure unless activated at temperatures above 120° C, that would destroy many typical shoe materials. The activation temperature of methylenedianiline/sodium chloride complexes can be reduced to about 90° C by addition of certain active hydrogen compounds including urea, according to the teachings of U.S. Pat. No. 3,891,606, but this is still too high a temperature for most shoe materials. Therefore, a polyurethane-based adhesive capable of producing in a short time and at a moderate temperature bonds having good strength is greatly needed.

SUMMARY OF THE INVENTION

According to this invention, there is now provided a polyurethane adhesive based on an isocyanate-terminated prepolymer made from 1.2-2.0 moles of tolylene diisocyanate containing at least 65% of the 2,4-isomer, 1 mole of poly(tetramethyleneoxy) glycol having a number average molecular weight of about 400 to 3000, and a poly(ethyleneoxy) compound having a number average molecular weight of about 310-4000 and containing 7-30 ($-CH_2-CH_2O-$) groups and 1 or 2 hydroxyl groups, its ($-CH_2-CH_2O-$) groups providing 0.5-4% of the combined weight of the poly(ethyleneoxy) compound and poly(tetramethyleneoxy) glycol, while the poly(tetramethyleneoxy) provides no less than 80% of said combined weight. A mixture of a methylenedianiline/sodium chloride complex with finely ground urea can be used as the curing agent for the isocyanate-terminated prepolymer to form an adhesive suitable for show sole attaching operations.

DETAILED DESCRIPTION OF THE INVENTION

While the isocyanate-terminated prepolymer based on tolylene diisocyanate and poly(tetramethyleneoxy) glycol alone can be cured with a dispersion of a methylenedianiline/sodium chloride complex containing powdered urea at a temperature of about 90° C, a prepolymer additionally containing the poly(ethyleneoxy) compound can be cured with the same agent at a temperature of 70° C. The adhesive bond forms fast and has high strength. This lower temperature does not damage the usual shoe sole materials or deform the molded shoe bottoms.

The isocyanate-terminated prepolymer can be readily made by those skilled in the art. Preparation of prepolymers of the present invention will suitably follow the teachings of U.S. Pat. No. 2,929,800 (to Hill) and U.S. Pat. No. 3,755,261 (to Van Gulick) modified by the incorporation of the poly(ethyleneoxy) compound. The order of addition of the ingredients is not critical. The preferred proportion of the poly(ethyleneoxy) compound is such that its ($-CH_2-CH_2O-$) groups provide 1.0 to 3.0% of the combined weight of poly(ethyleneoxy) compound and poly(tetramethyleneoxy) glycol. It is critical for the success of this invention that the prepolymers be based on a poly(tetramethyleneoxy) glycol, which must constitute at least 80% of the combined weight of poly(ethyleneoxy) compound and poly(tetramethyleneoxy) glycol. Poly(ethyleneoxy) glycols and polyester glycols, for example, have been found to produce inferior results.

The include, compound is the product of addition of ethylene oxide to a suitable compound having one or two active hydrogens. Representative starting materials from which the poly(ethyleneoxy) compounds of this invention are prepared include, for example, the following.

A. Alcohols such as methanol, ethanol, butanol, octanol, decanol, dodecanol, octadecanol and cyclohexanol.

B. Diols such as ethylene glycol, butanediol, hexanediol, cyclohexanediol, diethylene glycol, dipropylene glycol and poly(propyleneoxy) glycols.

C. Phenols such as phenol, cresol, naphthol, octylphenol, nonylphenol and dodecylphenol.

D. Monocarboxylic acids such as acetic, butyric, lauric, palmitic, stearic and benzoic acids.

E. Dicarboxylic acids such as succinic, glutaric, sebacic, dodecanedioic, isophthalic and terephthalic acids.

F. Amides of any monocarboxylic acids of the type described under D, above.

G. Mercaptans and thiophenols such as butyl mercaptan, dodecylmercaptan, and thiophenol.

The preferred poly(ethyleneoxy) compounds are the readily available and highly effective oxyethylated alcohols, phenols, and diols; for example, octylphenoxypoly(ethyleneoxy) ethanols, nonylphenoxypoly(ethyleneoxy) ethanols, poly(ethyleneoxy) glycol, and oxyethylated poly(propyleneoxy) glycols. Because of their basic character, which may adversely affect the stability of the adhesive compositions of the present invention, amines are not suitable starting materials.

The ethylene oxide reaction products will have repeating units ($-CH_2-CH_2-O-$). Some commercial products suitable in the practice of the present invention are made by adding both ethylene oxide and propylene oxide to the base compound having one or two active hydrogens. Usually, these alkylene oxide adducts contain both poly(ethyleneoxy) and poly(propyleneoxy) blocks. For the purpose of this invention, the number of propyleneoxy units is not critical, so long as the total number of ethyleneoxy groups ($-CH_2-CH_2-O-$) in the molecule is within the 7–30 range, the total molecular weight is no more than 4000, and the mole ratio of ethyleneoxy units to propyleneoxy units is not less than 0.2.

Commercial products suitable in the practice of the present invention are available from several sources under trade names such as, for example, "Pluronic", BASF Wyandotte Corp., and "Triton", Rohm and Haas. Other suitable poly(ethyleneoxy) compounds can be made, for example, according to the process described in U.S. Pat. No. 2,674,619.

The methylenedianiline/sodium chloride complex usually is sold as a dispersion in an inert liquid. Such dispersions can be prepared following the general procedure of U.S. Pat. No. 3,876,604 (to Caruso et al). Finely powdered urea is best added to methylenedianiline/sodium chloride complex as a dispersion. The urea dispersion can be made by ball-milling urea with an inert liquid of U.S. Pat. No. 3,876,604 until proper particle size is obtained (usually, less than 20 microns). The amount of urea used should be 2–5 parts per 100 parts by weight of complex.

The proportion of the methylenedianiline/sodium chloride complex to the prepolymer is such that the amine $-NH_2/-NCO$ mole ratio is about 0.95:1 to 1.50:1, ratios of 1.00:1 to 1.30:1 being preferred. Below 0.95, the bond development is too slow for most industrial applications, while above 1.50 the ultimate bond strength is often too low. It is interesting to note that the compositions of the present invention can be used not only as heat-activated adhesives but also as casting or liquid injection-molding compositions. Should the present system be used for casting or molding, rather than as an adhesive, the lower limit of the $-NH_2/-NCO$ range can be as low as 0.70, the preferred range being 0.85–1.20. Within the preferred range, cured articles having best physical properties are obtained.

In the practice of the present invention, the adhesive is used as a two-part system. The isocyanate-terminated prepolymer which contains the poly(ethyleneoxy) compound is mixed with the curing agent shortly before use. The composition has at room temperature a potlife in excess of 8 hours; preferred compositions, in excess of 24 hours. The adhesive is applied by suitable means such as brushing, doctoring or transfer coating onto one or both surfaces which are to be bonded; the adhesive surface or surfaces are heated to initiate reaction, and the parts joined in a press for at least 10 seconds. The bonded assembly is sufficiently strong to be subjected to the remaining steps of footwear finishing. The strength of the bond increases with time, approaching its maximum within several hours after bonding.

The adhesive composition of the present invention can be also used, if desired, in other applications, including those where parts to be joined are coated with the adhesive composition, assembled together, and then heated to full cure. Such applications require, of course, heat-stable parts to be joined.

This invention is now illustrated by the following examples of certain representative embodiments thereof, wherein all parts, proportions, and percentages are by weight unless otherwise indicated.

EXAMPLE 1

To 100 g of an isocyanate-terminated Prepolymer A containing 4.1% free isocyanate groups (prepared by a reaction of 1.0 mole poly(tetramethyleneoxy) glycol of molecular weight 1000 with 1.6 moles of 2,4-tolylene diisocyanate for 3 hours at 80° C) is added 3.25 g of octylphenoxypoly(ethyleneoxy) ethanol having an average molecular weight of about 756 and a poly(ethyleneoxy) block of 12–13 ($-CH_2-CH_2O-$) units. These proportions provide a ($-CH_2-CH_2O-$) content of 2.93% by weight and a poly(tetramethyleneoxy) glycol content of 97.1% based on the total weight of poly(ethyleneoxy) compound and poly(tetramethyleneoxy) glycol. After 3 days at 25° C, the resulting reaction product (Prepolymer B) contains 3.7% free isocyanate groups.

Both Prepolymer A and Prepolymer B are made into adhesives by combining with either curing agent C consisting of a 1:1 dispersion of methylenedianiline/sodium chloride complex in di(2-ethylhexyl) phthalate or curing agent D which is prepared by adding 4.5 parts per 100 parts of curing agent C of a 50% dispersion of finely divided urea in di(2-ethylhexyl) azelate.

| | | |
|---|---|---|
| (a) | Prepolymer A | 100 parts |
| | Curing Agent C | 26.7 parts |
| (b) | Prepolymer B | 100 parts |
| | Curing Agent C | 25.6 parts |
| (c) | Prepolymer A | 100 parts |
| | Curing Agent D | 27.9 parts |
| (d) | Prepolymer B | 100 parts |
| | Curing Agent D | 26.7 parts |

All four adhesive compositions are still workable 24 hours after preparation. The four compositions are used as adhesives by coating 5 mils (0.13 mm) of the adhesive on roughed 0.3 cm thick slabs of cured styrene-butadiene copolymer. The slabs are immediately heated by radiant heat using a Compo Industries, Inc. 220 volt adhesive activator so that the adhesive reaches a surface temperature of 73° C. Immediately after heating, the adhesive coating is placed in contact with the vinyl surface of a vinyl-coated fabric containing about 30% dioctyl phthalate as a plasticizer in the vinyl coating and the combined assembly is pressed at 0.41 MPa for 20 sec. The combined pieces are then peel tested as described in ASTM D2558-69 section 8.1 at a jaw separation rate of 5 cm/min. The results are shown in the following table:

| Peel Strength, kN/m - With Curing Agent C | | |
|---|---|---|
| Prepolymer | 1 Min After Release from Press | 3 Hrs After Release from Press |
| A | < 0.02 | 0.02 |
| B | 0.2 | 3.0 |

| Peel Strength, kN/m - With Curing Agent D | | |
|---|---|---|
| Prepolymer | 1 Min After Release from Press | 3 Hrs After Release from Press |
| A | 0.2 | 1.6 |
| B | 1.1 | 5.8 |

The above results show the improved bonding performance of the modified Prepolymer B with both curing agents. When Prepolymer B is used with curing agent D, the resulting adhesive gives high-strength bonds.

Similar results are obtained using chemically equivalent amounts of nonylphenoxypoly(ethyleneoxy) ethanols having number average molecular weights of 600–900.

EXAMPLE 2

To 100 g of Prepolymer A (used in Example 1) is added 6.05 g of an oxyethylated poly(propyleneoxy) glycol derived by end-capping poly(propyleneoxy) glycol with poly(ethyleneoxy) groups. The glycol has an average molecular weight of 2750 and contains about 25% by weight of ethyleneoxy units, which corresponds to 16 ethyleneoxy units total. For this composition the (—CH$_2$—CH$_2$O—) fraction is 1.84% and the poly(tetramethyleneoxy) glycol content is 92.8% of the combined weight of both glycols. After standing for 3 days at 25° C, the resulting Prepolymer E contains 3.6% free isocyanate groups.

The results of adhesion tests using the procedure and curing agent D (from Example 1) are shown below. The proportions used are as follows:

| (a) Prepolymer A | 100 parts |
|---|---|
| Curing Agent D | 26.8 parts |
| (b) Prepolymer E | 100 parts |
| Curing Agent D | 25.9 parts |

| | Peel Strength, kN/m | |
|---|---|---|
| Prepolymer | 1 Min after Removal from Press | 3 Hrs After Removal from Press |
| A | 0.09 | 1.1 |
| E | 1.2 | 5.3 |

EXAMPLE 3

To 100 g of Prepolymer A (used in Example 1) is added 2.0 g of poly(ethyleneoxy) glycol of molecular weight 1000 (degree of polymerization 22–23) to form Prepolymer F with a free isocyanate content of 3.6%. The proportion of (—CH$_2$—CH$_2$O—) units is 2.49%, and the proportion of poly(tetramethyleneoxy) glycol is 97.5% of the total weight of both glycols.

The results of adhesion tests using the procedure and curing agent D (from Example 1) with Prepolymers A and F are shown below. The proportions used are as follows:

| (a) Prepolymer A | 100 parts |
|---|---|
| Curing Agent D | 27.3 parts |
| (b) Prepolymer F | 100 parts |
| Curing Agent D | 24.5 parts |

| | Peel Strength, kN/m | |
|---|---|---|
| Prepolymer | 1 Min After Release from Press | 8 Hours After Release from Press |
| A | 0.04 | 2.1 |
| F | 0.9 | 6.7 |

The effect of degree of polymerization of the poly(ethyleneoxy) diol of the general formula HO—(CH$_2$—Ch$_2$—O)$_n$—H on the peel strength of the finished adhesive is shown below using diols with degrees of polymerization 13–22. The various glycols are all used in amounts of 2.0 millimoles per 100 g of Prepolymer A.

| Prepolymer | (—CH$_2$CH$_2$O—) % | PTMEG % | Peel Strength, kN/m 2 Min After Release From Press |
|---|---|---|---|
| A | | | 0.14 |
| F where n = 13 | 1.44 | 98.5 | 1.2 |
| 17 | 1.88 | 98.1 | 1.4 |
| 22–23 | 2.49 | 97.5 | 1.6 |

EXAMPLE 4

A series of prepolymers (B$_x$) was prepared, to show the effect of the number of ethyleneoxy groups, by mixing 4.3 millimoles of octylphenoxypoly(ethyleneoxy) ethanols of the general formula:

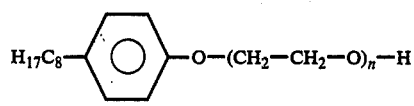

with 100 g of Prepolymer A from Example 1.

The results of adhesion tests using one day-old adhesives made from 100 g of prepolymers B$_x$ and 26 g of curing agent D are shown below. An adhesive prepared from unmodified Prepolymer A is included as a control.

| Prepolymer | (—CH$_2$CH$_2$O—) % | PTMEG % | 8 Hr Bond Strength, kN/m |
|---|---|---|---|
| A | | | 0.04 |
| B$_x$ where n = 1 | 0.24 | 98.6 | 0.09 |
| 3 | 0.71 | 98.2 | 0.18 |
| 5 | 1.18 | 97.8 | 1.2 |
| 7 – 8 | 1.76 | 97.1 | 2.1 |
| 9 – 10 | 2.23 | 96.7 | 2.8 |
| 12 – 13 | 2.91 | 96.0 | 7.0 |

The above Examples 2–4 further illustrate the exceptionally good results obtained with adhesive systems of the present invention.

EXAMPLE 5

A series of four modified prepolymers were prepared by the procedure of Example 1 by adding increasing amounts of an oxyethylated poly(propyleneoxy) glycol derived by end-capping poly(propyleneoxy) glycol with poly(ethyleneoxy) units to 100 g portions of Prepolymer A. The oxyethylated poly(propyleneoxy) glycol had a molecular weight of about 2650 and contained about 30% by weight of —$CH_2$—$CH_2O$— units. The modified prepolymers were made into adhesives by the addition of curing agent D. The resulting adhesives were evaluated by bonding slabs of styrene-butadiene copolymer to vinyl-coated fabric as described in Example 1. The pot-life of the adhesives was determined by measuring their viscosities 8 hours and 24 hours after preparation.

Proportions and test results are presented in the following table along with results for a control adhesive to which no polyethyleneoxy compound was added.

|  | Control | Preparation 5-A | 5-B | 5-C | 5-D |
|---|---|---|---|---|---|
| Poly(oxyethylene) compound, g/100 g Prepolymer A | — | 2.94 | 7.76 | 10.3 | 19.4 |
| Poly(tetramethyleneoxy) glycol, %* | 100.0 | 96.3 | 92.0 | 88.0 | 79.5 |
| Ethyleneoxy units, %* | — | 0.93 | 2.00 | 3.01 | 5.12 |
| Curing Agent D, parts/100 parts modified prepolymer | 27.9 | 26.6 | 24.5 | 22.5 | 19.1 |
| Peel Strength, kN/m 1 min after release from press | 0.35 | .88 | .88 | .53 | — |
| Adhesive viscosity, Pa . s, 26° C, 8 hr. after preparation | 35 | 33 | 74 | 135 | ** |
| Pa . s, 26° C, 24 hr. after preparation | 64 | 73 | 486 | ** | ** |

*Based on the sum of the weights of poly(tetramethyleneoxy) glycol and poly(ethyleneoxy) compound.
**Too viscous to measure.

The results show that the addition of poly(ethyleneoxy) compound increases peel strength. However, in preparation 5-D where the level of poly(ethyleneoxy) compound was high enough to provide 5% ethyleneoxy units and to reduce the concentration of poly(tetramethyleneoxy) glycol below 80%, the adhesive was too viscous for use. Preparation 5-D is outside the limits of this application.

EXAMPLE 6

Three prepolymers were prepared by the procedure used for Prepolymer A of Example 1 with the exception that poly(tetramethyleneoxy) glycol (MW 1000) was replaced by an equal weight of
  A. poly(ethylene adipate) glycol (MW 1000),
  B. poly(ethyleneoxy) glycol (MW 1000), or
  C. poly(1,2-propyleneoxy) glycol (MW 1000).

Prepolymers A and B were made into adhesive compositions by the addition of 27.9 parts of curing agent D per 100 parts of prepolymer. In less than 8 hours both of these adhesive compositions became too viscous for use.

A portion of Prepolymer C was modified by the addition of 3.25 g of octylphenoxypoly(ethyleneoxy)ethanol having an average molecular weight of 756 following the procedure of Example 1 to form a prepolymer designated as Prepolymer C'. Prepolymers C and C' were converted to adhesives by the addition of 27.9 and 26.7 parts per 100 parts prepolymer, respectively, of curing agent D. The resulting adhesives were tested by bonding styrene-butadiene copolymer and vinyl-coated fabric as in Example 1. Peel strengths 1 minute after release from the press were less than 0.02 kN/m which is inadequate for use as a shoe adhesive.

None of the above preparation is within the scope of this application. They are provided to illustrate the criticality of using poly(tetramethyleneoxy) glycol in preparing the present adhesives.

I claim:

1. A curable polyurethane prepolymer made by a reaction of 1.2-2.0 moles of tolylene diisocyanate containing at least 65% of the 2,4-isomer with 1 mole of poly(tetramethyleneoxy) glycol having a number average molecular weight of about 400-3000, and a poly(ethyleneoxy) compound having a number average molecular weight of about 310-4000 and containing 7-30 (—$CH_2$—$Ch_2O$—) groups and 1 or 2 hydroxyl groups, its (—$CH_2$—$CH_2O$—) groups providing 0.5-4.0% of the combined weight of the poly(ethyleneoxy) compound and poly(tetramethyleneoxy) glycol, while the poly(tetramethyleneoxy) glycol provides no less than 80% of said combined weight.

2. The prepolymer of claim 1 wherein the proportion of the poly(ethyleneoxy) compound is such that its (—$CH_2$—$CH_2O$—) groups provide 1.0-3.0% of the combined weight of poly(ethyleneoxy) compound and poly(tetramethyleneoxy) glycol.

3. The prepolymer of claim 2 wherein the poly(ethyleneoxy) compound is a poly(ethyleneoxy) glycol, or an oxyethylated poly(propyleneoxy) glycol.

4. The prepolymer of claim 2 wherein the poly(ethyleneoxy) compound is an alkylphenoxypoly(ethylenoxy) ethanol.

5. The prepolymer of claim 1 wherein the tolylene diisocyanate is the 2,4-isomer.

6. A composition consisting essentially of a prepolymer of Claim 1 and a mixture of a methylenedianiline/sodium chloride complex in a mole ratio of 3:1 with urea in such proportions that the mole ratio of amine —$NH_2$ to —NCO is about 0.95:1 to 1.50:1, the proportion of urea being 2-5 parts per 100 parts by weight of the methylenedianiline/sodium chloride complex.

7. A composition of claim 6 wherein the proportions are such that the ratio of amine —$NH_2$ to —NCO is 1.00:1 to 1.30:1.

8. A method of bonding two or more surfaces, wherein at least one surface to be bonded is coated with a composition of claim 6; the coated surface is heated to about 70° C; the surfaces are joined together and held together for at least 10 seconds.

9. A method of bonding two or more surfaces, wherein at least one surface to be bonded is coated with a composition of claim 7, the coated surface is heated to about 70° C; the surfaces are joined together and held together for at least 10 seconds.

10. A bonded article made by the method of claim 9.

11. A shoe in which the upper is bonded to the sole by the method of claim 8.

* * * * *

UNITED STATES PATENT OFFICE
CERTIFICATE OF CORRECTION

PATENT NO. : 4,125,522
DATED : November 14, 1978
INVENTOR(S) : Judith W. Becker

It is certified that error appears in the above-identified patent and that said Letters Patent are hereby corrected as shown below:

In the abstract, line 2, "isocyanateter-" should be "isocyanate-ter-".

In Column 2, line 50, omit "include," and insert in its place "poly(ethyleneoxy)".

In Column 4, line 44, insert "The proportions are as follows:".

In Column 6, line 22, "Ch$_2$" should be "CH$_2$".

In Column 8, line 9, "preparation" should be "preparations".

Signed and Sealed this

Eighth Day of May 1979

[SEAL]

Attest:

RUTH C. MASON
Attesting Officer

DONALD W. BANNER
Commissioner of Patents and Trademarks